United States Patent [19]
Shimizu et al.

[11] Patent Number: 6,038,343
[45] Date of Patent: Mar. 14, 2000

[54] CHARACTER RECOGNITION METHOD AND APPARATUS USING WRITER-SPECIFIC REFERENCE VECTORS GENERATED DURING CHARACTER-RECOGNITION PROCESSING

[75] Inventors: Hiroyuki Shimizu, Kawasaki; Takahiko Kawatani, Yokohama, both of Japan

[73] Assignee: Hewlett-Parkard Company, Palo Alto, Calif.

[21] Appl. No.: 08/795,221

[22] Filed: Feb. 5, 1997

[30] Foreign Application Priority Data

Feb. 6, 1996 [JP] Japan .................................. 8-020133

[51] Int. Cl.⁷ ............................................. G06K 9/00
[52] U.S. Cl. .......................... 382/187; 382/197; 382/227
[58] Field of Search .................................. 382/186, 187, 382/190, 203, 204, 224, 161, 197, 227

[56] References Cited

U.S. PATENT DOCUMENTS

| | | | |
|---|---|---|---|
| 4,651,289 | 3/1987 | Maeda et al. | 382/190 |
| 5,023,918 | 6/1991 | Lipscomb | 382/187 |
| 5,105,468 | 4/1992 | Guyon et al. | 382/187 |
| 5,191,622 | 3/1993 | Shojima et al. | 382/161 |
| 5,343,537 | 8/1994 | Bellegarda et al. | 382/186 |
| 5,555,320 | 9/1996 | Irie et al. | 382/190 |
| 5,577,135 | 11/1996 | Grajski et al. | 382/187 |
| 5,588,074 | 12/1996 | Sugiyama | 382/190 |
| 5,745,599 | 4/1998 | Uchiyama et al. | 382/187 |
| 5,754,686 | 5/1998 | Harada et al. | 382/186 |

OTHER PUBLICATIONS

Kawatani, Takahiko; "Character Recognition Performance Improvement Using Personal Handwriting Characteristics", IEEE, 1995, pp. 98–103.

Kawatani, Takahiko et al.; "Verification of Personal Handwriting Characteristics for Numeral and Its Application to Recognition", Pattern Recognition Letters 14 (1993), pp. 335–434.

*Primary Examiner*—Yon J. Couso
*Attorney, Agent, or Firm*—Ian Hardcastle

[57] ABSTRACT

Character recognition with an improved recognition ratio is provided without requiring special operations to be performed before character recognition is performed. A preliminary character recognition operation is performed in which the feature vector of an input character is compared to a recognition dictionary that contains a reference vector for each category. The candidate category to which the input character belongs is determined, and the feature vector and recognition result for each input character is saved. The input characters judged to have been recognized with high reliability are selected with reference to their recognition results. The feature vector of each selected input character is used to predict a writer-specific feature vector of a category different from the candidate category to which the selected input character belongs. A writer-specific reference vector is then generated for each category from the writer-specific feature vector of the category, preferably by using the writer-specific feature vector to correct the reference vector for the category. A final character recognition operation is then performed in which the feature vectors of the input characters are compared with the writer-specific reference vectors.

18 Claims, 3 Drawing Sheets

CHARACTER RECOGNITION METHOD AND APPARATUS USING WRITER-SPECIFIC REFERENCE VECTORS GENERATED DURING CHARACTER-RECOGNITION PROCESSING

FIELD OF THE INVENTION

This invention relates to the field of character recognition. More particularly, the invention relates to a method that improves the recognition ratio of character recognition by taking account of font differences and the personal writing style of the writer.

BACKGROUND OF THE INVENTION

Character recognition is typically implemented in the three stages, preprocessing, feature extraction, and discrimination. In the preprocessing stage, size normalization of the input character pattern and noise removal are normally performed.

During the feature extraction stage, multiple feature values that represent the features of each input character are extracted from the input character pattern and a feature vector representing the feature values is generated. Each feature of the input character represents a portion of the structure of the input character. Typical features include the length of stroke, the angle of stroke, and the number of loops. For example, when the feature is the number of loops, the feature value may have one the following values:

0: when the input character is the numeral "1", "2" or "3",

1: when the input character is the numeral "0", "6" or "9," and

2: when the input character is the numeral "8."

Typically many hundreds of feature values are extracted for each input character in the input character pattern. The feature values are represented by a feature vector whose elements each represent the feature value of one of the features of the input character. A feature vector has a large number of dimensions, with 500 dimensions being typical.

In the discrimination stage, the feature vector of each input character in the input character pattern is compared with a reference vector for each category. The input character is determined to belong to the category whose reference vector is closest to the feature vector of the input character. In character recognition, each "category" represents one character. For example, in numeral recognition, a category exists for each of the characters "0," "1," ..., "9."

The effectiveness of a character recognition system is characterized by its "recognition ratio." When character recognition is performed, one of the following results is obtained for each input character in the input character pattern: (1) the category to which the input character belongs is correctly recognized; (2) the input character is successfully recognized as belonging to a category, but the category is incorrect; or (3) the input character is not recognized as belonging to any category. For example, when the input character is the numeral "1," result (1) occurs when the input character is recognized as belonging to the category "1;" result (2) occurs when the input character is erroneously recognized as belonging to the category "7," for example, and result (3) occurs when the category to which the input character belongs cannot be recognized. The recognition ratio is the number of character recognition events that generate result (1) divided by the total number of input characters in the input character pattern. A successful character recognition system is one that has a recognition ratio close to unity (or 100%).

The reference vectors are stored in a recognition dictionary. The recognition dictionary is statistically created from character patterns obtained from the handwriting of many people. Before the character recognition system can be used for handwriting recognition, the recognition dictionary is created by a number of unspecified writers each handwriting a predetermined set of characters. The category to which each of the characters in the set belongs is known. The feature vectors extracted from the characters in each category are averaged and each average vector is stored in the recognition dictionary as the reference vector for the category.

Because the recognition dictionary just described is created from the handwriting of unspecified writers, this type of recognition dictionary can be regarded as a universal recognition dictionary that can be used to perform character recognition on the writing of any writer. However, because of the stylistic differences between writers, the recognition ratio of a character recognition system employing a universal recognition dictionary will depend greatly on how closely each writer's style matches the average represented by the reference vectors stored in the universal recognition dictionary.

It is known in the prior art to improve the recognition ratio of a character recognition system by requiring each of the writers whose handwriting is to be recognized by the system to hand write a set of predetermined characters to create a personal recognition dictionary. However, the requirement that each writer hand write a set of predetermined characters before character recognition is performed is impractical in a character-recognition system designed to recognize the handwriting of many different writers.

Although a character recognition system for handwriting must tolerate the variations in characters that result from the system being used by different writers, these variations are also a primary factor that hinders improving the recognition ratio of such systems. For example, if the characters in one category written by one writer resemble the characters in another category written by another writer, accurate character recognition of the handwriting of both writers will be extremely difficult if the same recognition dictionary is used. To solve this problem, as noted above, conventional prior-art systems store a personal recognition dictionary for each writer whose handwriting will be recognized by the system. The personal recognition dictionary is created by requiring the writer to hand write a predetermined set of characters before the system performs character recognition on the writer's handwriting.

The document Improving Handwritten Character Recognition Using Personal Writing Characteristics, TRANSACTIONS OF THE INSTITUTE OF ELECTRONICS, INFORMATION AND COMMUNICATION ENGINEERS, Vol. J78-D-II, No. 7, July 1995, discloses methods for improving character recognition of handwritten characters when it is not feasible for the person using the system to hand write a predetermined set of characters before the system performs character recognition on the writer's handwriting. See also T. Kawatani, Character Recognition Performance Improvement Using Personal Handwriting Characteristics, IEEE 0-8186-7128-9/95 (1995); and T. Kawatani, N. Miyamoto, Verification of Personal Handwriting Characteristicsfor Numerals and its Application to Recognition, 14 PATTERN RECOGNITION LETTERS, pp. 335–343 (1993). These papers describe system in which the number of input characters that are erroneously recognized (result (2) above) is reduced, but the techniques described do not necessarily provide in an improvement of the recognition ratio (result (1) above).

Thus, the development of a character recognition apparatus and method having an improved recognition ratio would constitute a major technological advance. The ability to improve the recognition ratio without requiring that special operations be performed before character recognition is performed on the handwriting of a new writer would constitute a further technological advance.

SUMMARY OF THE INVENTION

An improved character recognition apparatus and method are provided. Compared with conventional character recognition systems, the apparatus and method have an improved recognition ratio but do not require special operations to be performed before they perform character recognition on the handwriting of a new writer, i.e., a writer whose handwriting has not previously been subject to character recognition by the apparatus or method. In the apparatus and method, the feature vector of each input character in the input character pattern is compared with a universal recognition dictionary containing a reference vector for each category to make a preliminary determination of a candidate category to which the input character belongs. The feature vector and recognition result for each input character are preferably saved. The recognition result is preferably composed of the candidate category for the input character, together with a value quantifying the distance or similarity between the feature vector of the input character and the reference vector of the candidate category.

After recognition results have been generated for a number of input characters, input characters are selected by reference to the recognition results. The feature vectors of the selected input characters are used to predict a writer-specific feature vector for at least one category other than the candidate category. A writer-specific reference vector is generated for each category using the writer-specific feature vector for the category. The writer-specific reference vector represents the features of the input characters actually written by the current writer. The writer-specific reference vector is preferably generated by using the writer-specific feature vector for the category to correct the reference vector for the category. Alternatively, the writer-specific reference vector may be generated by adopting the writer-specific feature vector as the writer-specific reference vector. A final character recognition process is then performed using the writer-specific reference vectors to make a final determination of the category to which each of the input characters belongs.

The selected input characters are preferably input characters that have been recognized with high reliability.

DETAILED DESCRIPTION OF THE INVENTION

The character recognition apparatus and method according to the invention provide an improved recognition ratio, i.e., the number of input characters that are correctly recognized divided by the total number of input characters in the input character pattern. The apparatus and method reliably recognize characters that are hard to recognize using conventional recognition dictionaries, such as universal recognition dictionaries that are designed for unspecified writers. The apparatus and method effect such improvements without requiring that any special operations be performed before character recognition are performed on the handwriting of a new writer.

The apparatus and method according to the invention receive an input character pattern from a new writer and, while performing character recognition on the new writer's input character pattern, additionally perform processing that accumulates information on the personal writing style of the new writer. The information on the personal writing style of the writer accumulates in the form of writer-specific reference vectors that are used to increase the recognition ratio of the character recognition processing by taking account of the writer's writing style.

The apparatus and method first perform a preliminary character recognition operation on the input characters in the character input pattern. The preliminary character recognition operation uses a universal recognition dictionary composed of reference vectors derived from sets of predetermined characters hand written by unspecified writers. The preliminary character recognition operation determines a candidate category for each input character.

The results of the preliminary character recognition operation are used to predict, from the feature vector of each of selected input characters, a writer-specific feature vector is then predicted for at least one category other than the candidate category of the selected input character. The selected input characters are preferably input characters judged to have been recognized with high reliability in the preliminary character recognition operation. The writer-specific feature vectors are specific to the writer. A writer-specific reference vector for each category is generated from the writer-specific feature vectors. The writer-specific reference vector is preferably generated by correcting each reference vector from the universal recognition dictionary using the corresponding writer-specific feature vector. Alternatively, the writer-specific feature vector may be adopted as the writer-specific reference vector. Finally, a final character-recognition process is performed using the writer-specific reference vectors to make a final determination of the category to which each of the input characters belongs.

The apparatus and method will also provide a high recognition ratio when character recognition is performed on the handwriting of different writers and the characters in one category written by one of the writers resemble the characters in another category written by another of the writers.

The apparatus and method according to the invention will also provide a high recognition ratio when used to perform character recognition a printed input character pattern. The high recognition ratio is provided even when the printed input character pattern is in a font on which the apparatus and method have not previously performed character recognition. In this case, the apparatus and method generates font-specific reference vectors, analogous to writer-specific reference vectors, that are specific to the font in which the printed input character pattern is set.

To simplify the following description, the description will focus on the application of the apparatus and method according to the invention to performing character recognition on handwritten characters. However, the description is equally relevant to the application of the apparatus and method to perform character recognition on printed input character patterns.

The apparatus and method according to the invention use to advantage two facts about personal handwriting characteristics described by T. Kawatani and N. Miyamoto in Verification of Personal Handwriting Characteristics for Numerals and its Application to Recognition, 14 PATTERN RECOGNITION LETTERS, pp. 335–343 (1993):

The features of input characters belonging to the same category written by the same person are similar; and There is harmony among the features of input characters written by the same person even in different categories, i.e., there is a valid or high correlation among the features of input characters in different categories.

Similar observations apply to printed fonts.

The inventors have recognized that these characteristics of handwriting enable the feature vectors of those of a writer's input characters that are reliably recognized as belonging to a category to be used to predict, for this writer, a writer-specific feature vector for a number of other categories. Since these writer-specific feature vectors are predicted from the feature vectors extracted from the writer's own input characters, the writer-specific feature vectors are personal to the writer. An improved recognition ratio can then be achieved using the writer-specific feature vectors to generate writer-specific reference vectors. A final character recognition operation is then performed using the writer-specific reference vectors.

In the embodiments of the apparatus and method to be described below, the writer-specific feature vectors are vectors predicted using the feature vectors extracted from a first specified number of input characters in the input character pattern. The writer-specific reference vectors are generated by using the writer-specific feature vectors to correct the non writer-specific reference vectors stored in the universal recognition dictionary so that the final character recognition processing is performed using reference vectors that are adapted to the writer's writing style.

Figure 1:
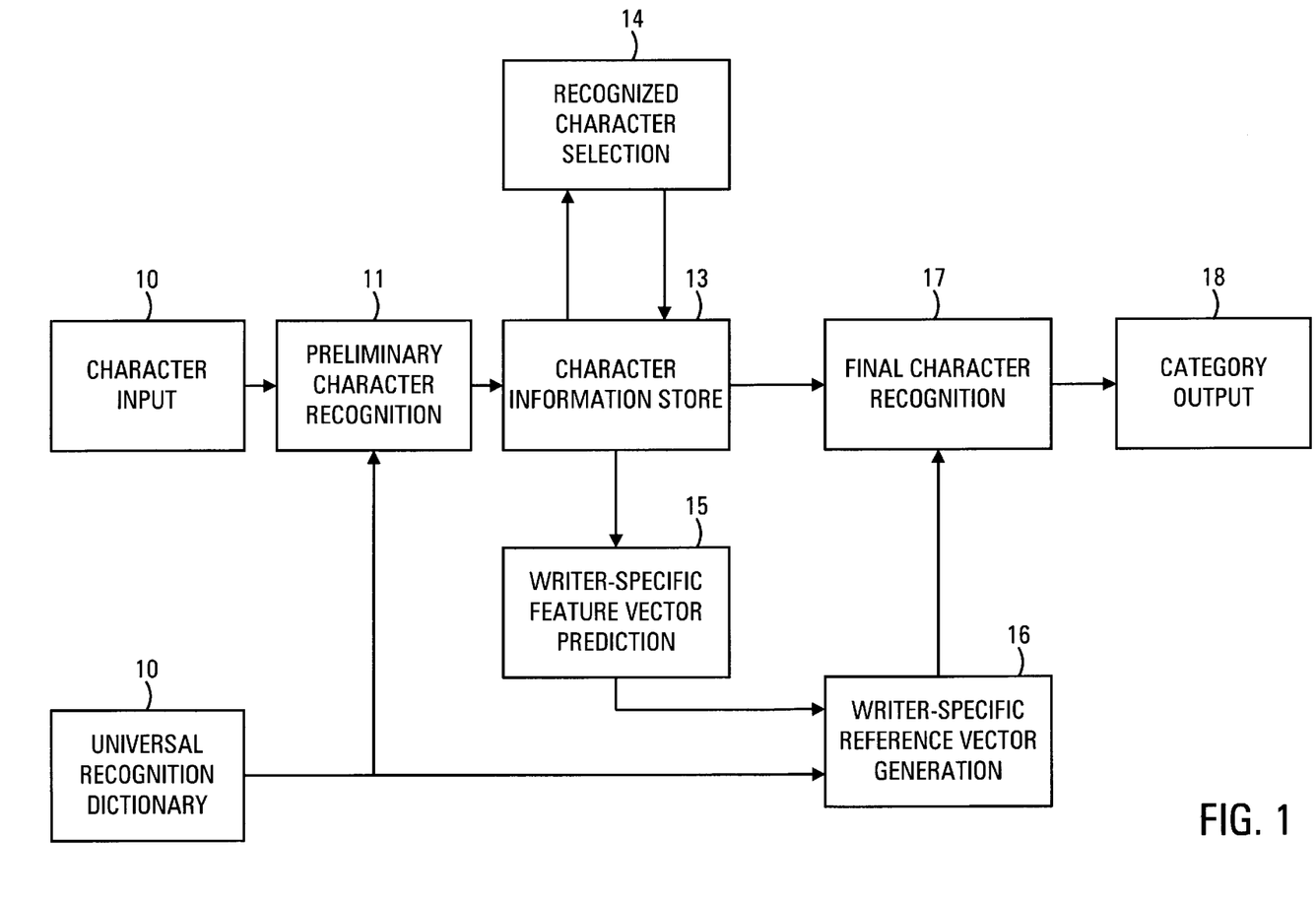
FIG. 1 is a block diagram of a character-recognition apparatus according to the invention.

FIG. 1 shows a functional block diagram of one embodiment of the character recognition apparatus according to the invention. The apparatus is preferably implemented by suitably programming a computer or digital signal processor. Alternatively, the apparatus may be implemented by constructing the functional blocks shown in FIG. 1 from suitable small- or large-scale integrated circuits or from discrete components.

The character recognition apparatus shown in FIG. 1 performs character recognition on input character patterns supplied by multiple writers without each writer having to provide any input of a predetermined character set. The writer on whose handwriting the apparatus performs character recognition will be called the "current writer." The following description assumes that the character recognition apparatus has not previously performed character recognition on any input character pattern written by the current writer.

The character input block 10 receives the input character pattern written by the current writer. The current writer may supply the input character pattern in real time using a suitable handwriting input device. Alternatively, the input character pattern may be scanned in from a paper or some other medium. Since there is no need for the writer to input a set of predetermined characters to the apparatus, the writer may be elsewhere, or even deceased, when the writer's input character pattern is input to the apparatus.

The preliminary character recognition block 11 receives the input character pattern from the character input block 10 and performs a preliminary character recognition operation on each input character in the input character pattern using a reference vector for each category received from the universal recognition dictionary 12. The universal recognition dictionary may be a read-only memory, part of a random-access memory, part of a mass storage device, such as a hard disk, or some other suitable storage device. The reference vectors stored in the universal recognition dictionary are derived from the feature vectors of sets of predetermined characters handwritten by a number of unspecified writers.

The preliminary character recognition block 11 preprocesses each input character and extracts a feature vector for the input character. The preliminary character recognition block then compares the feature vector of the input character with the reference vector for each category to determine a candidate category for the input character. The candidate category for each input character may be determined, for example, by determining a value quantifying the similarity or distance between the feature vector of the input character and the reference vector of each category. A difference may be determined by calculating the Euclidian distance between the feature vector of the input character and the reference vector of each category. Alternatively, a similarity S having the range $0<S<1$ may be calculated using the equation:

$$S=(F)(R)/(|F|\times|R|)$$

where F is the feature vector of the input character,

R is the reference vector of the category, and (F)(R) is the inner product between the feature vector and the reference vector.

The resulting distance or similarity values between the feature vector of the input character and the reference vector of each category are then compared with one another. The category having the greatest similarity value or the smallest difference value is determined to be the candidate category.

For simplicity, the following description will only refer to the difference value, and will no longer refer to a similarity value as an alternative. The term "difference value" is to be understood to encompass the term "similarity value" as an alternative. Also, the term "smallest difference value" is to be understood to encompass the term "largest similarity value" as an alternative. Finally, the term "distance value smaller than" is to be understood to encompass the term "similarity value greater than" as an alternative.

The preliminary character recognition block 11 generates a recognition result and passes the feature vector and recognition result for each input character to the character information store 13. The recognition result is composed of the candidate category of the input character, and the distance value quantifying the distance between the feature vector of the input character and the reference vector of the candidate category. The character information store 13 stores the feature vector and recognition result for each input character in the input character pattern input by the current writer. The character information store may be part of a random-access memory, part of a mass storage device, such as a hard disk, or some other suitable storage device. The character information store and the universal recognition dictionary may be parts of the same physical device.

Full operation of the recognized character selection block 14, the writer-specific feature vector prediction block 15, the writer-specific reference vector generation block 16, the final character recognition block 17 and the category output block 18 is preferably delayed until the preliminary character recognition block 11 has generated a recognition result for a predetermined number of input characters and the recognition results for these input characters have been stored in the character information store 13. Alternatively, full operation of these blocks may be delayed until after a specific condition is satisfied. An example of the specific condition is the input characters being recognized with a predetermined level of reliability.

Once the predetermined number of recognition results have been accumulated in the character information store 13, or the specific condition has been met, the recognized character selection block 14 operates on the recognition results stored in the character information store to select the input characters that have been recognized with high reliability. The recognized character selection block may select such input characters by identifying those input characters having a distance value smaller than a threshold value. Alternatively, no threshold need be set, and a predetermined number of input characters having the smallest distance values may be selected as the selected input characters.

The writer-specific feature vector prediction block 15 receives information identifying the selected input characters from the recognized character selection block 14, and receives the feature vector for each of these input characters from the character information store 13. The writer-specific feature vector prediction block subjects the feature vector for each selected input character to a regression equation to predict a writer-specific feature vector for at least one category other than the candidate category determined by the character recognition block 11 for the selected input character.

The regression equation is determined by statistical analysis that will be described in more detail below. A regression equation can be used to predict the writer-specific feature vectors from the feature vectors of the selected input characters selected by the recognized character selection block 14 because of the harmony among the features of the input characters written by the same writer in different categories. The writer-specific feature vectors predicted by the writer-specific feature vector prediction block are specific to the current writer whose handwriting constitutes the input character pattern. If the apparatus later performs character recognition on another writer's handwriting, the writer-specific feature vector prediction block will predict another set of writer-specific feature vectors different from the writer-specific feature vectors predicted for the current writer.

The following is an example of the regression equation used by the writer-specific feature vector prediction block 15 to predict the writer-specific feature vector Yb for category b from the feature vector Xa of the input character having category a as its candidate category:

$$Yb = Bab \cdot Xa + E \tag{1}$$

where:

Xa is the feature vector of the input character having category a as its candidate category;

Bab is the regression coefficient matrix of the regression equation that predicts the writer-specific feature vector for category b from the feature vector of the input character having category a as its candidate category;

E is a constant vector; and

Yb is the writer-specific feature vector for category b.

The writer-specific feature vector prediction block 15 will predict more than one writer-specific feature vector for at least some categories. For example, the writer-specific feature vector prediction block may predict a writer-specific feature vector for category b from the feature vector of a selected input character whose candidate category is category a, and may also predict a writer-specific feature vector for category b from the feature vector of a selected input character whose candidate category is category c. The writer-specific feature vector prediction block may average the writer-specific feature vectors predicted for each such category to generate the writer-specific feature vector for the category. The writer-specific feature vector prediction block may apply suitable weighting to the averaging process.

The writer-specific feature vectors predicted by the writer-specific feature vector prediction block 15 for the current writer pass to the writer-specific reference vector generation block 16. The writer-specific reference vector generation block also receives the reference vectors for unspecified writers from the universal recognition dictionary 12. The writer-specific reference vector generation block corrects the reference vectors from the universal recognition dictionary using the writer-specific feature vectors to generate a writer-specific reference vector for each category.

An example of the correction equation applied by the writer-specific reference vector generation block is:

$$Z'a = \Omega \cdot Ya + \beta \cdot Za \tag{2}$$

where:

Ya is the writer-specific feature vector for category a for the current writer;

Za is the reference vector for category a for unspecified writers;

$\Omega$ and $\beta$ are constant matrices. Generally, these matrices are matrices that include all of the elements of a diagonal matrix; and Z'a is the writer-specific reference vector for category a for the current writer.

The writer-specific reference vector generation block 16 may alternatively generate the writer-specific reference vectors by adopting the writer-specific feature vector for each category as the writer-specific reference vector for the category.

The final character recognition block 17 receives the writer-specific reference vectors from the writer-specific reference vector generation block 16 and receives the feature vector and recognition result for each input character from the character information store 13. The final character recognition block determines a new distance value between the feature vector of each input character and the writer-specific reference vector for each category. The final character recognition block then performs a final discrimination procedure in which the distance value received from the character information store for the input character is corrected by adding the new distance values just determined to generate a corrected distance value for each category. Alternatively, final discrimination procedure may determine the corrected distance value for each category by calculating the distance between the feature vector of the input character and the writer-specific reference vector for each category. In either case, the input character is determined to belong to the category having the smallest corrected distance value.

The output block 18 outputs a stream of categories, one category for each input character in the input character pattern.

Figure 2:
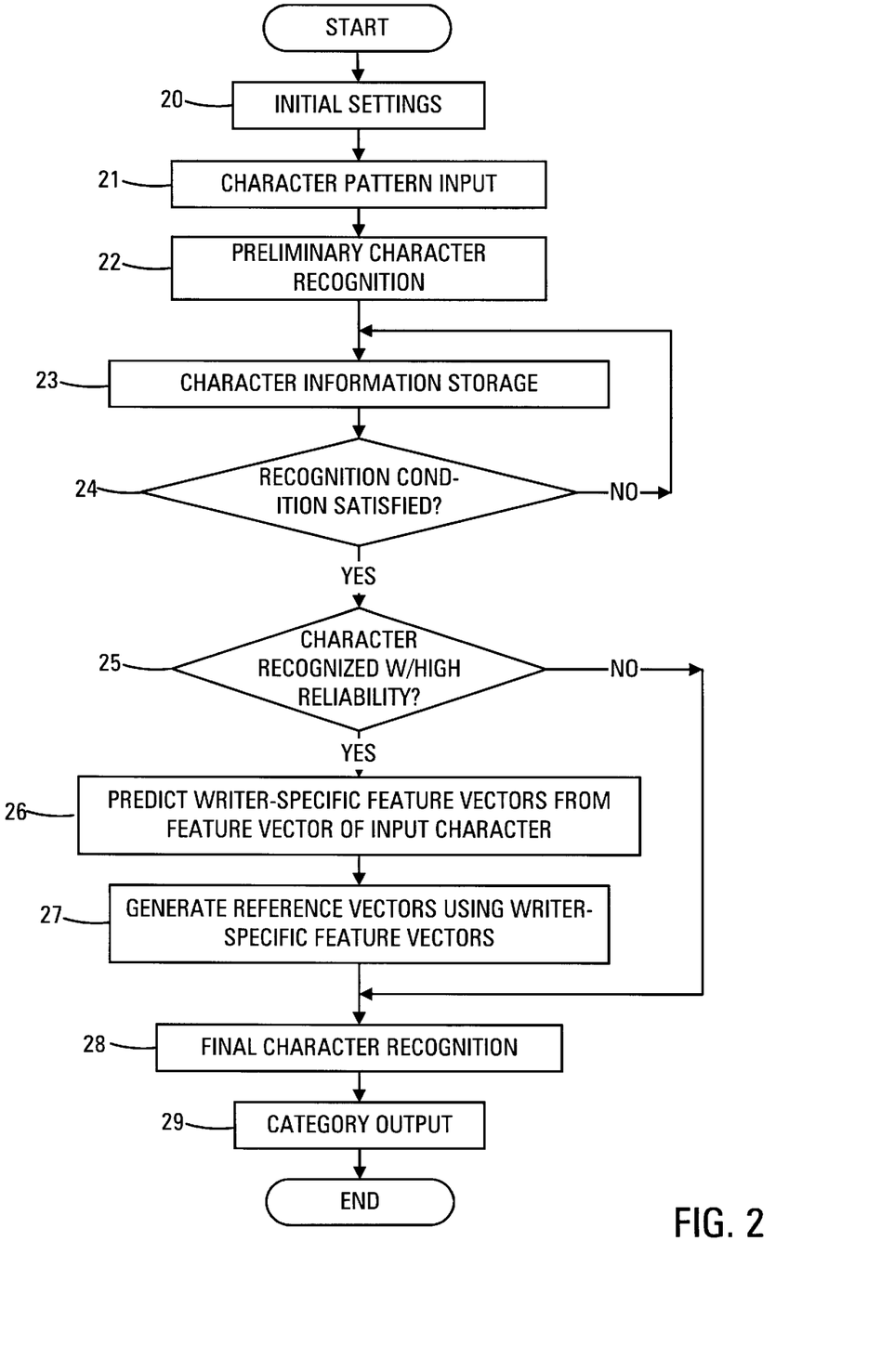
FIG. 2 is a flow chart of a character-recognition process according to the invention.

FIG. 2 is a flow chart showing the operation of an exemplary embodiment of the method according to the invention. The method begins by initializing the settings, such as the recognition conditions, in step 20. The input character pattern written by the current writer is then input in step 21. In step 22, a preliminary character recognition process is performed on the input characters of the input character pattern using a universal recognition dictionary similar to the universal recognition dictionary 12 shown in FIG. 1. The universal recognition dictionary includes a reference vector for each category. The reference vectors are determined by a large number of unspecified writers each hand writing a predetermined set of characters, as described above. In step 23, the feature vector and a recognition result is stored for each input character. The recognition result may include the candidate category determined by the preliminary character recognition process, and the distance value between feature vector of the input character and the reference vector of the candidate category.

Step 24 determines whether the condition for advancing to the next step has been met. The condition is whether the preliminary character recognition process has been performed on a specific number of input characters of the input character pattern. Alternatively, the condition may be whether a specific condition, such as recognizing characters with a high reliability, has been met. If the condition is met in step 24, execution advances to step 25. Otherwise, execution returns to step 22.

In step 25, the recognition results stored in step 23 are analyzed to select the input characters that have been recognized with high reliability. The feature vector and recognition result for each selected character is passed to step 26. The feature vector and recognition result for the remaining characters are passed to step 28.

In step 26, the feature vector of each selected input character selected in step 25 is subjected to the regression equation described above to predict a writer-specific feature vector for each of multiple categories other than the candidate category allocated in the preliminary character recognition process performed in step 22. In step 27, a user-specific reference vector is generated for each category by correcting the reference vectors using the writer-specific feature vectors predicted in step 26. The correction is preferably performed using the reference correction equation described above.

In step 28, a final character recognition process is performed on the input characters not selected in step 25. In step 28, the final character recognition process is performed using the user-specific reference vector generated for each category in step 27. A category for each input character in the input character pattern is finally output in step 29.

Figure 3:
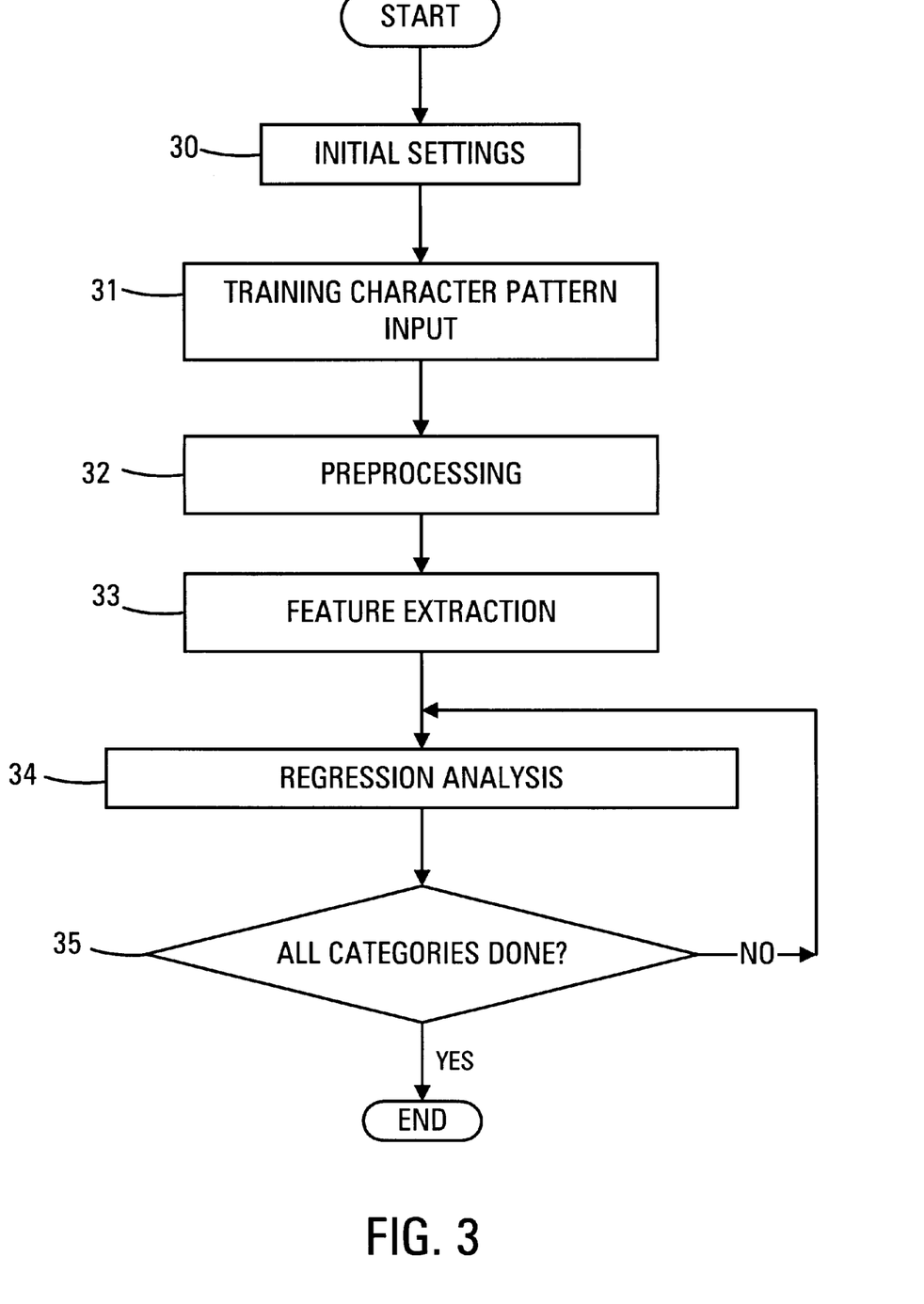
FIG. 3 is a flow chart of a regression coefficient decision process according to the invention.

FIG. 3 is a flow chart showing the method for determining the regression coefficients of the regression equation used to predict a writer-specific feature vector for each of multiple alternative categories from the feature vector of an input character. The regression equation is applied at step 26 in the method shown in FIG. 2, for example. The method begins by setting the required initial values in step 30. Standard test patterns hand written by many people, are then input in step 31. Preprocessing, such as normalizing the position, tilt, and size, is then performed on each test pattern in step 32. The feature vectors are then extracted from the input characters in each preprocessed test pattern in step 33. Since the category of each input character in the test patterns is already known, the feature vector extracted for a given input character can be said to be the feature vector for the category to which the input character belongs.

In step 34, a regression analysis between pairs of categories is performed using the feature vector extracted in step 33 for each category in the pair of categories. In the regression analysis, the feature vectors extracted for each category from all the preprocessed test patterns are averaged to determine an average feature vector for the category. The average feature vectors for the two categories constituting the category pair are then used to determine a variance-covariance matrix of each category pair. The variance-covariance matrix represents the scatter of each feature value in the category pair, and the correlation between the different feature values. Conditional step 35 checks whether a regression coefficient has been determined for all of the category pairs. If this condition is not met, execution returns to step 34 where the regression analysis is repeated for another category pair. If the condition is met, execution stops.

Although the character recognition apparatus and method are described in connection with their use to perform character recognition on handwritten characters, the invention may also be applied to any of a wide variety of printed texts in different fonts, as desired. The invention may also be implemented using a wide variety of manual platforms, automated computer platforms, nodes, or networks, or any combination thereof, as desired.

Although the present invention has been described in detail with reference to a particular preferred embodiment, persons of ordinary skill in the art to which this invention pertains will appreciate that various modifications and enhancements may be made without departing from the scope of the claims that follow.

We claim:

1. A method for recognizing characters, the method comprising steps of:

providing a set of reference vectors, each of the reference vectors representing a category, the reference vectors being derived from writing samples provided by non-specified writers;

performing a preliminary character recognition operation on plural input characters to make a preliminary determination of the category to which each of the input characters belongs by comparing a feature vector of the one of the input characters to the reference vectors to determine a candidate category and to generate a recognition result;

with reference to the recognition results for the plural input characters, selecting each of the input characters that has been recognized with high reliability as a selected input character;

predicting, from the feature vector of each selected input character, a writer-specific feature vector for at least one category other than the candidate category of the selected input character;

generating a writer-specific reference vector for each category using the writer-specific feature vector predicted for the category; and performing a final character recognition operation using the writer-specific reference vectors to make a final determination of the category to which each of the input characters belongs.

2. The method of claim 1, in which:

the recognition result for each input character includes a distance value between the feature vector of the input character and the reference vector of the candidate category; and the step of selecting each input character that has been recognized with high reliability includes a step of selecting an input character having a low distance value as the selected input character.

3. The method of claim 1, in which, in the step of generating a writer-specific reference vector, the writer-specific reference vector for each category is generated by adopting the writer-specific feature vector predicted for the category as the writer-specific reference vector for the category.

4. The method of claim 1, in which, in the step of generating a writer-specific reference vector, the writer-specific reference vector for each category is generated by correcting the reference vector for the category using the writer-specific feature vector for the category.

5. The method of claim 4, in which the step of correcting the reference vector for the category includes steps of:

multiplying the reference vector for the category by a first constant matrix to obtain a first product;

multiplying the writer-specific feature vector for the category by a second constant matrix to obtain a second product; and     adding the first product to the second product to obtain the writer-specific reference vector for the category.

6. The method of claim 1, in which the step of selecting each input characters is performed after a specific condition has been satisfied.

7. The method of claim 6, in which the specific condition is the preliminary character recognition operation being performed on a specific number of the input characters.

8. The method of claim 1, in which the step of predicting a writer-specific feature vector for at least one other category includes steps of:

multiplying the feature vector of the input character by a regression coefficient matrix to obtain a product; and     adding a constant matrix to the product to obtain the writer-specific feature vector.

9. The method of claim 1, in which:

in the step of predicting a writer-specific feature vector for at least one category, plural writer-specific feature vectors are generated for the one category; and     the method additionally includes a step of averaging the plural writer-specific feature vectors to obtain the writer-specific feature vector for the one category.

10. An apparatus for recognizing characters, the apparatus comprising:

a recognition dictionary in which are stored reference vectors derived from writing samples provided by non-specified writers, each of the reference vectors representing a category;

preliminary character recognition means for comparing a feature vector of each input character in an input character pattern to the reference vectors in the recognition dictionary to preliminarily determine the candidate category to which the input character belongs;

a character information store in which the feature vector and the candidate category of each input character are stored;

recognized character selection means for selecting, from the input characters stored in the character information store, each of the input characters that has been recognized with high reliability as a selected input character;

writer-specific reference vector generating means for receiving the feature vectors of the selected input characters from the character information store, and for generating therefrom a writer-specific reference vector for each category, the feature vector of each selected input character being used to generate the writer-specific reference vector for at least one category different from the candidate category to which the selected input character belongs; and     final character recognition means, operating in response to the writer-specific reference vector for each category, for finally determining the category to which each input character belongs.

11. The apparatus of claim 10, in which:

the preliminary character recognition means is additionally for generating a distance value between the feature vector of the input character and the reference vector of the candidate category;

the distance value of each input character is stored in the character information store; and     the recognized character selection means includes:

means for receiving the distance values from the character information store, and         means for selecting an input character having a low distance value as a selected input character.

12. The apparatus of claim 10, in which the writer-specific reference vector generating means includes:

means for predicting, from the feature vector of each selected input character, a writer-specific feature vector for the at least one category different from the candidate category to which the selected input character belongs; and     means for adopting the writer-specific feature vector predicted for each category as the writer-specific reference vector for the category.

13. The apparatus of claim 10, in which the writer-specific reference vector generating means includes:

means for predicting, from the feature vector of each selected input character, a writer-specific feature vector for the at least one category different from the candidate category to which the selected input character belongs; and     reference vector correcting means, operating in response to the writer-specific feature vector for each category, for correcting the reference vector for the category to obtain the writer-specific reference vector for the category.

14. The apparatus of claim 13, in which the reference vector correcting means includes:

multiplying means for multiplying the reference vector for the category by a first constant matrix to obtain a first product and for multiplying the writer-specific feature vector for the category by a second constant matrix to obtain a second product; and     means for adding the first product to the second product to obtain the writer-specific reference vector for the category.

15. The apparatus of claim 10, in which the means for selecting each of the input characters operates until a specific condition has been satisfied.

16. The apparatus of claim 15, in which the specific condition is the preliminary character recognition means comparing the feature vectors of a specific number of input characters.

17. The apparatus of claim 10, in which the writer-specific reference vector generating means includes:

means for multiplying the feature vector of the input character by a regression coefficient matrix between each category and the candidate category of the input character to obtain a product;

means for adding a constant matrix to the product to obtain a writer-specific feature vector of the category; and     means for deriving the writer-specific reference vector for the category from the writer-specific feature vector for the category.

18. The apparatus of claim 10, in which:

the writer-specific feature vector generating means includes:

writer-specific feature vector generating means for generating a writer-specific feature vector for each category from the feature vectors of the selected input characters, the writer specific feature vector generating means generating plural writer-specific feature vectors for at least one category, and including means for averaging the plural writer-specific feature vectors to obtain a writer-specific feature vector for the at least one category, and means for deriving the writer-specific reference vector for each category from the writer-specific feature vector for the category.

* * * * *